US012737262B2

(12) United States Patent
Peck et al.

(10) Patent No.: US 12,737,262 B2
(45) Date of Patent: Sep. 15, 2026

(54) SNAPSHOT REPAIR IN A DEDUPLICATION STORAGE SYSTEM

(71) Applicant: HEWLETT PACKARD ENTERPRISE DEVELOPMENT LP, Spring, TX (US)

(72) Inventors: Joshua Peck, Bristol (GB); Jack Smith, Bristol (GB); Richard Phillip Mayo, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 145 days.

(21) Appl. No.: 18/460,387

(22) Filed: Sep. 1, 2023

(65) Prior Publication Data

US 2025/0077356 A1 Mar. 6, 2025

(51) Int. Cl.
*G06F 11/00* (2006.01)
*G06F 11/1446* (2026.01)

(52) U.S. Cl.
CPC ...... *G06F 11/1453* (2013.01); *G06F 11/1451* (2013.01); *G06F 2201/84* (2013.01)

(58) Field of Classification Search
CPC ......................... G06F 11/1453; G06F 11/1451
See application file for complete search history.

(56) References Cited

U.S. PATENT DOCUMENTS

| | | | |
|---|---|---|---|
| 7,415,632 | B1 | 8/2008 | Beale et al. |
| 7,756,834 | B2 | 7/2010 | Masters et al. |
| 8,977,602 | B2 | 3/2015 | Shoens |
| 9,959,179 | B1 | 5/2018 | Yu et al. |
| 10,275,308 | B2 | 4/2019 | Czezatke et al. |
| 10,366,076 | B1 | 7/2019 | Yu |
| 11,036,677 | B1 | 6/2021 | Grunwald et al. |

(Continued)

FOREIGN PATENT DOCUMENTS

| | | | |
|---|---|---|---|
| CN | 109828951 | A | 5/2019 |
| CN | 114443357 | A | 5/2022 |

(Continued)

OTHER PUBLICATIONS

Cha et al., "SplitScreen: Enabling Efficient, Distributed Malware Detection," Apr. 2011, Journal of Communications and Networks, vol. 13, No. 2, pp. 187-200.

(Continued)

*Primary Examiner* — Katherine Lin
(74) *Attorney, Agent, or Firm* — Trop, Pruner & Hu, P.C.

(57) ABSTRACT

Example implementations relate to deduplication operations in a storage system. An example includes identifying a corrupt data unit included in a first snapshot; identifying a first manifest that references the corrupt data unit; identifying, based on the first manifest, a first container index that indexes the corrupt data unit; determining, based on the first container index, a set of candidate manifests; identifying, in the set of candidate manifests, a second manifest having a highest match score with respect to a first portion of the first manifest; and in response to a determination that the identified second manifest having the highest match score does not reference the corrupt data unit, replacing in the first manifest a reference to a corrupt data unit with a reference to a non-corrupt data unit referenced in the identified second manifest.

20 Claims, 14 Drawing Sheets

(56) References Cited

U.S. PATENT DOCUMENTS

| | | | |
|---|---|---|---|
| 11,360,689 | B1 | 6/2022 | Grunwald et al. |
| 2008/0127336 | A1 | 5/2008 | Sun et al. |
| 2012/0330863 | A1 | 12/2012 | Mcdougal et al. |
| 2013/0111591 | A1 | 5/2013 | Topan et al. |
| 2015/0154398 | A1 | 6/2015 | Jones et al. |
| 2015/0179222 | A1 | 6/2015 | Kapa et al. |
| 2017/0293628 | A1 * | 10/2017 | Adler .................. G06F 11/1464 |
| 2021/0081432 | A1 | 3/2021 | Grunwald et al. |
| 2021/0303164 | A1 | 9/2021 | Grunwald et al. |
| 2021/0303527 | A1 | 9/2021 | Grunwald et al. |
| 2022/0138223 | A1 | 5/2022 | Sonner et al. |
| 2022/0147490 | A1 | 5/2022 | Shivani et al. |

FOREIGN PATENT DOCUMENTS

| | | | |
|---|---|---|---|
| EP | 2310974 | A2 | 4/2011 |
| EP | 3226169 | A1 | 10/2017 |
| WO | 2022/061170 | A1 | 3/2022 |

OTHER PUBLICATIONS

Hewlett Packard Enterprise Development LP, "HPE 3PAR File Persona User Guide," Jul. 2020, <https://support.hpe.com/hpesc/public/docDisplay?docId=c04777927&docLocale=en_US>.

Veritas, "Veritas NetBackup™ Deduplication Guide," Sep. 14, 2020, <https://www.veritas.com/support/en_US/doc/25074086-143197427-0/v95643095-143197427>.

* cited by examiner

| Manifest List 222 |
| --- |
| J-101 |
| C-23 |
| K-7 |
| B-4 |
| ⋮ |
| B-5 |

FIG. 2B

Alias Data Structure 270

| Corrupt Data Unit | Alias |
| --- | --- |
| DU3 | DU22 |
| DU4 | DU17 |
| DU9 | DU1 |
| DU11 | DU42 |
| ⋮ | ⋮ |
| DU38 | DU23 |

FIG. 2C

| | | | | | | | |
|---|---|---|---|---|---|---|---|
| 450 | 01 | 32 | 03 | 04 | 19 | 06 | 07 |
| 440 | 24 | 32 | 09 | 04 | 19 | 06 | 07 |
| 430 | 24 | 32 | 09 | 04 | 19 | 76 | 07 |
| 420 | 24 | 32 | 42 | 04 | 19 | 76 | 81 |
| 410 | 57 | 32 | 42 | 04 | 11 | 76 | 81 |

Repair 460

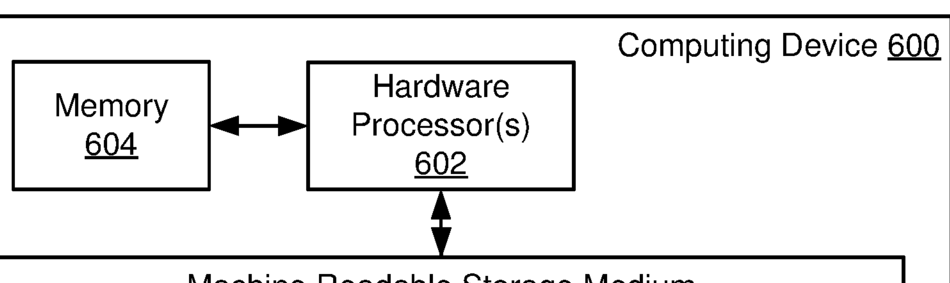

Machine Readable Storage Medium 606

610
Identify a corrupt data unit included in a first snapshot stored in a deduplication storage system 620
Identify a first manifest that references the corrupt data unit, where the first manifest records an ingest order of data units of the first snapshot into the deduplication storage system 630
Identify, based on the first manifest, a first container index that indexes the corrupt data unit 640
Determine, based on the first container index, a set of candidate manifests 650
Identify, in the set of candidate manifests, a second manifest having a highest match score with respect to a first portion of the first manifest 660
In response to a determination that the identified second manifest having the highest match score does not reference the corrupt data unit, replace, in the first manifest, a reference to a corrupt data unit with a reference to a non-corrupt data unit referenced in the identified second manifest

FIG. 6

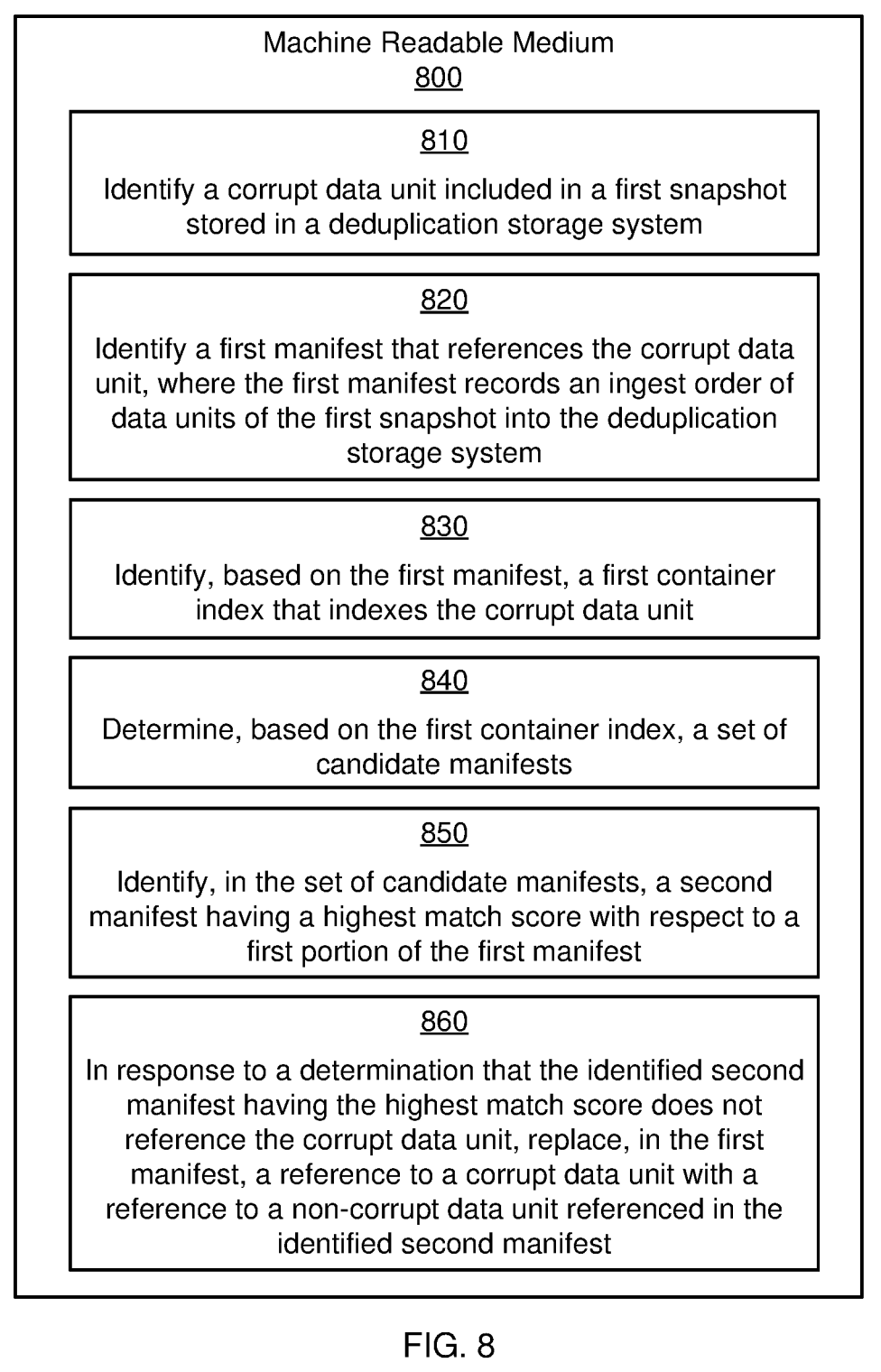

Machine Readable Medium
800

810
Identify a corrupt data unit included in a first snapshot stored in a deduplication storage system 820
Identify a first manifest that references the corrupt data unit, where the first manifest records an ingest order of data units of the first snapshot into the deduplication storage system 830
Identify, based on the first manifest, a first container index that indexes the corrupt data unit 840
Determine, based on the first container index, a set of candidate manifests 850
Identify, in the set of candidate manifests, a second manifest having a highest match score with respect to a first portion of the first manifest 860
In response to a determination that the identified second manifest having the highest match score does not reference the corrupt data unit, replace, in the first manifest, a reference to a corrupt data unit with a reference to a non-corrupt data unit referenced in the identified second manifest

FIG. 8

SNAPSHOT REPAIR IN A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIGS. 2A-2C are illustration of example data structures, in accordance with some implementations.

FIG. 6 is a schematic diagram of an example computing device, in accordance with some implementations.

FIG. 8 is a diagram of an example machine-readable medium storing instructions in accordance with some implementations.

Figure 1:
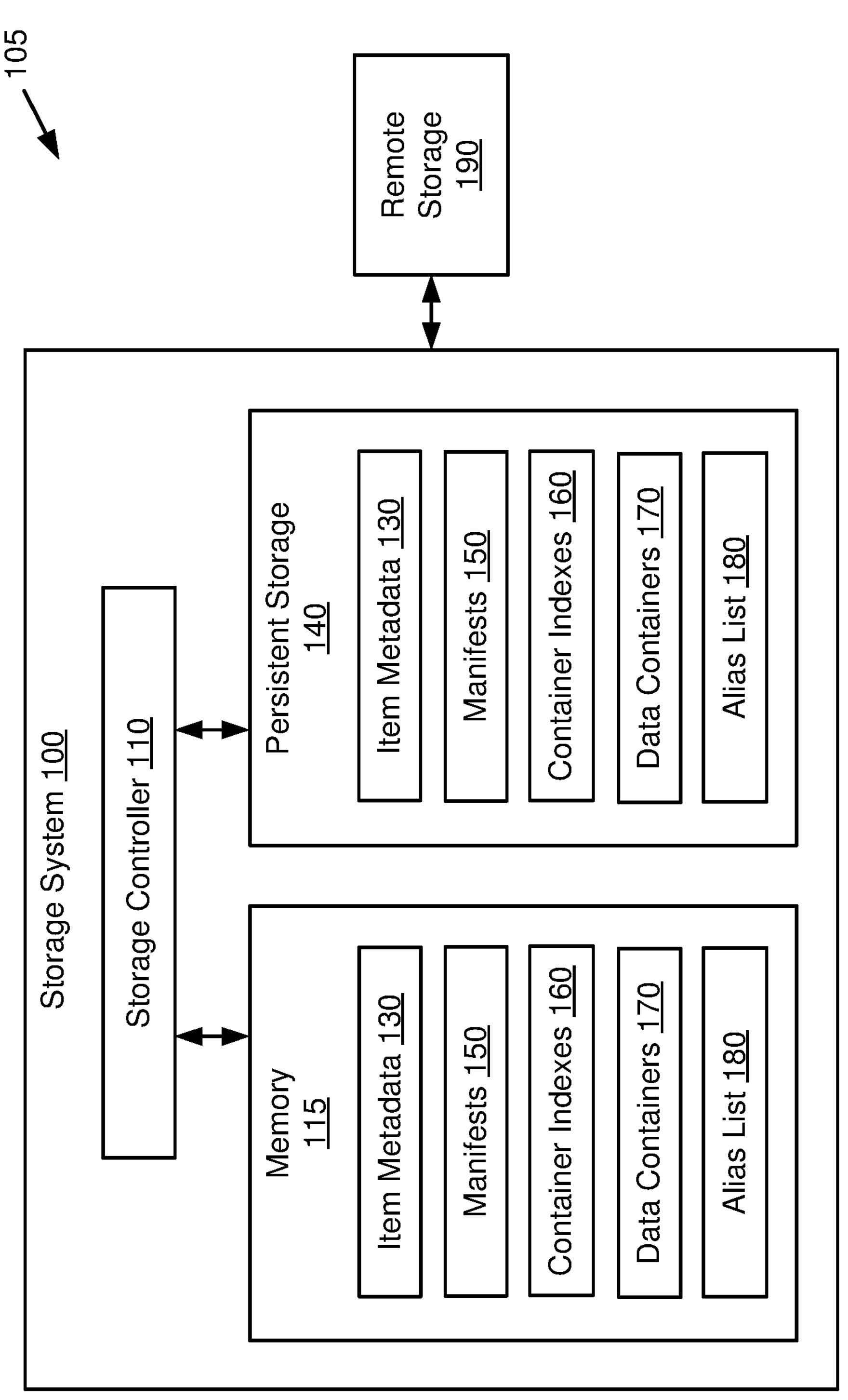
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data (referred to herein as a "stream" of data or a "data stream") in deduplicated form, thereby reducing the amount of storage space required to store the data stream. The storage system may create a "backup item" to represent a data stream in a deduplicated form. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units. A process for receiving and deduplicating an inbound data stream may be referred to herein as a "data ingest" process of a storage system.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof. A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing inbound data streams (e.g., backup items). For example, such metadata may include data recipes (also referred to herein as "manifests") that specify the order in which particular data units are received for each backup item. Further, such metadata may include item metadata to represent each received backup item in a deduplicated form. The item metadata may include identifiers for a set of manifests, and may indicate the sequential order of the set of manifests. The processing of each backup item may be referred to herein as a "backup process." Subsequently, in response to a read request, the deduplication system may use the item metadata and the set of manifests to determine the received order of data units, and may thereby recreate the original data stream of the backup item. Accordingly, the set of manifests may be a representation of the original backup item. The manifests may include a sequence of records, with each record representing a particular set of data unit(s). The records of the manifest may include one or more fields that identify container indexes that index (e.g., include storage information for) the data units. For example, a container index may include one or more fields that specify location information (e.g., containers, offsets, etc.) for the stored data units, compression and/or encryption characteristics of the stored data units, and so forth. Further, the container index may include reference counts that indicate the number of manifests that reference each data unit.

In some examples, upon receiving a data unit (e.g., in a data stream), it may be matched against one or more container indexes to determine whether an identical chunk is already stored in a container of the deduplication storage system. For example, the deduplication storage system may compare the fingerprint of the received data unit against the fingerprints in one or more container indexes. If no matching fingerprints are found in the searched container index(es), the received data unit may be added to a container, and an entry for the received data unit may be added to a container index corresponding to that container. However, if a matching fingerprint is found in a searched container index, it may be determined that a data unit identical to the received data unit is already stored in a container. In response to this determination, the reference count of the corresponding entry is incremented, and the received data unit is not stored in a container (as it is already present in one of the containers), thereby avoiding storing a duplicate data unit in the deduplication storage system. As used herein, the term "matching operation" may refer to an operation to compare fingerprints of a collection of multiple data units (e.g., from a particular backup data stream) against fingerprints stored in a container index.

In some examples, the deduplication storage system may process an inbound data stream to store a deduplicated copy (also referred to herein as a "snapshot") of all data blocks in a source collection of data (also referred to herein as a "source item") at a particular point in time. Further, in some examples, at least some data blocks in the source item may change over time. For example, a sales database (i.e., a source item) may be copied in a snapshot at a first point in time, and the sales database may subsequently be updated to include new records for additional sales transactions. Accordingly, the deduplication storage system may generate and store a sequence of snapshots to capture the changing state of the source item at different points in time. In some examples, some or all of the data units in the source item may be lost or rendered unusable (e.g., by a malware attack, a system failure, and so forth). In such examples, the stored snapshots may be used to recover at least some of the lost data of the source item. For example, if the sales database is lost due to a system failure, the most recent snapshot may be copied to regenerate the sales database as it existed at the time of that snapshot. However, such copying of the most recent snapshot will not recover the changes to the sales database that occurred after the creation of that most recent snapshot.

In some examples, a data unit included in a snapshot may become corrupted. As used herein, the term "corrupted" may refer to a data unit that does not include the correct data content. For example, a data unit in a source item may be corrupted by a malware attack, and that corrupted data unit may be copied into each subsequent snapshot of that source item. As such, the recent snapshot(s) that include the corrupt data unit may not be usable to repair the source item. Therefore, the repair of the source item may have to be performed using an older snapshot that does not include the corrupt data unit. Further, because an older snapshot is less similar to the source item than a recent snapshot (e.g., due to the accumulation of changes to the source item over time), having to use an older snapshot is likely to result in a greater loss of data when recovering the source item.

In accordance with some implementations of the present disclosure, a controller of a deduplication storage system may repair snapshots that include corrupt data units. The controller may identify a corrupt data unit included in a snapshot of a source item. The controller may identify a first manifest that references the portion of the snapshot that includes the corrupt data unit. The controller may then select a comparison window (e.g., a set of data units including the corrupt data unit) from the first manifest, and may compare the comparison window to a set of candidate manifests associated with previous snapshots of the source item. The controller may assign a match score to each candidate manifest based on its similarity to the comparison window. If the candidate manifest having the highest match score also references the corrupt data unit, the controller may select a new comparison window from that candidate manifest, and may then compare the remaining candidate manifests to the new comparison window. Upon determining that the candidate manifest with the highest score does not reference the corrupt data unit, the controller may identify a non-corrupt data unit from that candidate manifest, and may determine that the non-corrupt data unit should be used in the snapshot, instead of the corrupt data unit. Further, the controller may replace the reference to the corrupt data unit (in the first manifest) with a reference to the non-corrupt data unit. In this manner, the controller may repair the affected manifests with reduced (or no) loss of data, and may thereby improve the performance of the storage system. Various aspects of the disclosed repair process are discussed further below with reference to FIGS. 1-8.

FIG. 1—Example Storage System

FIG. 1 shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1, the memory 115 and the persistent storage 140 may store various data structures including at least item metadata 130, manifests 150, container indexes 160, data containers 170, and an alias list 180. In some examples, copies of the item metadata 130, manifests 150, container indexes 160, the data containers 170, and the alias list 180 may be transferred between the memory 115 and persistent storage 140 (e.g., via read and write input/output (I/O) operations).

In some implementations, the storage system 100 may perform a data ingest operation to deduplicate received data. For example, the storage controller 110 may receive an inbound data stream including multiple data units, and may store at least one copy of each data unit in a data container 170 (e.g., by appending the data units to the end of the data container 170). In some examples, each data container 170 may be divided into entities, where each entity includes multiple stored data units. Further, in some examples, an inbound stream may be deduplicated and stored as a backup item.

In one or more implementations, the storage controller 110 may generate a fingerprint for each received data unit. For example, the fingerprint may include a full or partial hash value based on the data unit. To determine whether an incoming data unit is a duplicate of a stored data unit, the storage controller 110 may perform a matching operation to compare the fingerprint generated for the incoming data unit to the fingerprints in at least one container index 160. If a match is identified, then the storage controller 110 may determine that a duplicate of the incoming data unit is already stored by the storage system 100. The storage controller 110 may then store references to the previous data unit, instead of storing the duplicate incoming data unit.

In some implementations, the storage controller 110 may generate item metadata 130 to represent each backup item in a deduplicated form. In some examples, a set of backup items (represented by a set of item metadata 130) may be a sequence of snapshots that capture the changing data content of a source item (e.g., a storage volume) at multiple points in time. Each item metadata 130 may include identifiers for a set of manifests 150, and may indicate the sequential order of the set of manifests 150. The manifests 150 record the order in which the data units were received.

In some implementations, the manifests 150 may include a pointer or other information indicating the container index 160 that indexes each data unit. In some implementations, the container index 160 may include a fingerprint (e.g., a hash) of a stored data unit for use in a matching process of a deduplication process. Further, the container index 160 may indicate the location in which the data unit is stored. For example, the container index 160 may include information specifying that the data unit is stored at a particular offset in an entity, and that the entity is stored at a particular offset in a data container 170. The container index 160 may also include reference counts that indicate the number of manifests 150 that reference each data unit.

In some implementations, the storage controller 110 may receive a read request to access the stored data, and in response may access the item metadata 130 and manifests 150 to determine the sequence of data units that made up the original data. The storage controller 110 may then use pointer data included in a manifest 150 to identify the container indexes 160 that index the data units. Further, the storage controller 110 may use information included in the identified container indexes 160 (and information included in the manifest 150) to determine the locations that store the data units (e.g., data container 170, entity, offsets, etc.), and may then read the data units from the determined locations.

In some implementations, the storage controller 110 may identify one or more corrupt data units included in a first snapshot of a source item, and may identify a manifest 150 that references the corrupt data unit(s). For example, the storage controller 110 may receive a message or command (e.g., from a user or program) that identifies a data range in a snapshot that includes a corrupt data unit (e.g., based on a scan or analysis of the snapshot). In some examples, the location of the corrupt data unit may be specified as an offset and size in a given backup item (e.g., a item metadata 130). In such examples, the storage controller 110 may determine a particular manifest 150 that represents the offset and size in the item metadata 130.

In some implementations, the storage controller 110 may select, in the manifest 150, a set of data unit references (also referred to herein as a "comparison window") that includes a reference to the corrupt data unit. For example, the storage controller 110 may select a comparison window that includes a subset of the data unit references in the manifest 150, where a reference to the corrupt data unit is located in the center of the comparison window (also referred to herein as the "center position"). An example implementation of a comparison window is described below with reference to FIG. 4B.

In some implementations, the storage controller 110 may identify a set of candidate manifests 150 that reference data units included in previous snapshots of the source item (e.g., multiple snapshots generated prior to the snapshot including the identified corrupt data unit). The storage controller 110 may compare the comparison window to each candidate manifest 150, and may assign a match score to each candidate manifest 150 based on its similarity to the comparison window. As used herein, the term "match score" may refer to a numerical value measuring the similarity between data units referenced in the comparison window and a set of data units referenced in the candidate manifest 150. For example, a match score may indicate how many data units are referenced in both the comparison window and a portion of the candidate manifest 150. An example calculation for a match score is described below with reference to FIGS. 4D-4G.

In some implementations, the storage controller 110 may identify the candidate manifest 150 having the highest match score (e.g., is most similar to the comparison window). Further, if the identified candidate manifest 150 also references the corrupt data unit, the storage controller 110 may select a new comparison window from the identified candidate manifest 150, and may then compare the remaining candidate manifests 150 to the new comparison window. If necessary, the storage controller 110 may repeat this process (e.g., determining that the candidate manifest 150 with the highest match score references the corrupt data unit, and then selecting a new comparison window) for multiple iterations, until it is determined that the candidate manifest 150 with the highest match score does not reference the corrupt data unit. Further, upon determining that the candidate manifest 150 with the highest match score does not reference the corrupt data unit, the storage controller 110 may select a non-corrupt data unit referenced in that candidate manifest 150. In some implementations, the non-corrupt data unit may be determined to be the correct data unit that should be present in the snapshot, instead of the corrupt data unit. Accordingly, the storage controller 110 may use the non-corrupt data unit to repair the manifests 150 that referenced the corrupt data unit (e.g., by replacing references to the corrupt data unit with references to the non-corrupt data unit). In this manner, the storage controller 110 may repair the manifests 150 with reduced (or no) loss of data, and may thereby improve the performance of the storage system 100. An example process for repairing manifests included in snapshots is described below with reference to FIGS. 3 and 4A-4M.

In some implementations, the storage controller 110 may create an entry in the alias list 180 to store information indicating that the non-corrupt data unit has been determined to be the replacement for the corrupt data unit. The non-corrupt data unit may be referred to herein as an "alias" for the corrupt data unit that it can replace (e.g., in a reference in a manifest 150). Subsequently, the storage controller 110 may compare received data units to the alias list 180. If a received data unit matches a corrupt data unit listed in an entry of the alias list 180, the storage controller 110 may replace, in a manifest 150, the received data unit with the non-corrupt data unit listed in that entry (i.e., the alias for the corrupt data unit). An example process for using the alias list 180 is described below with reference to FIG. 5.

Figure 2A:
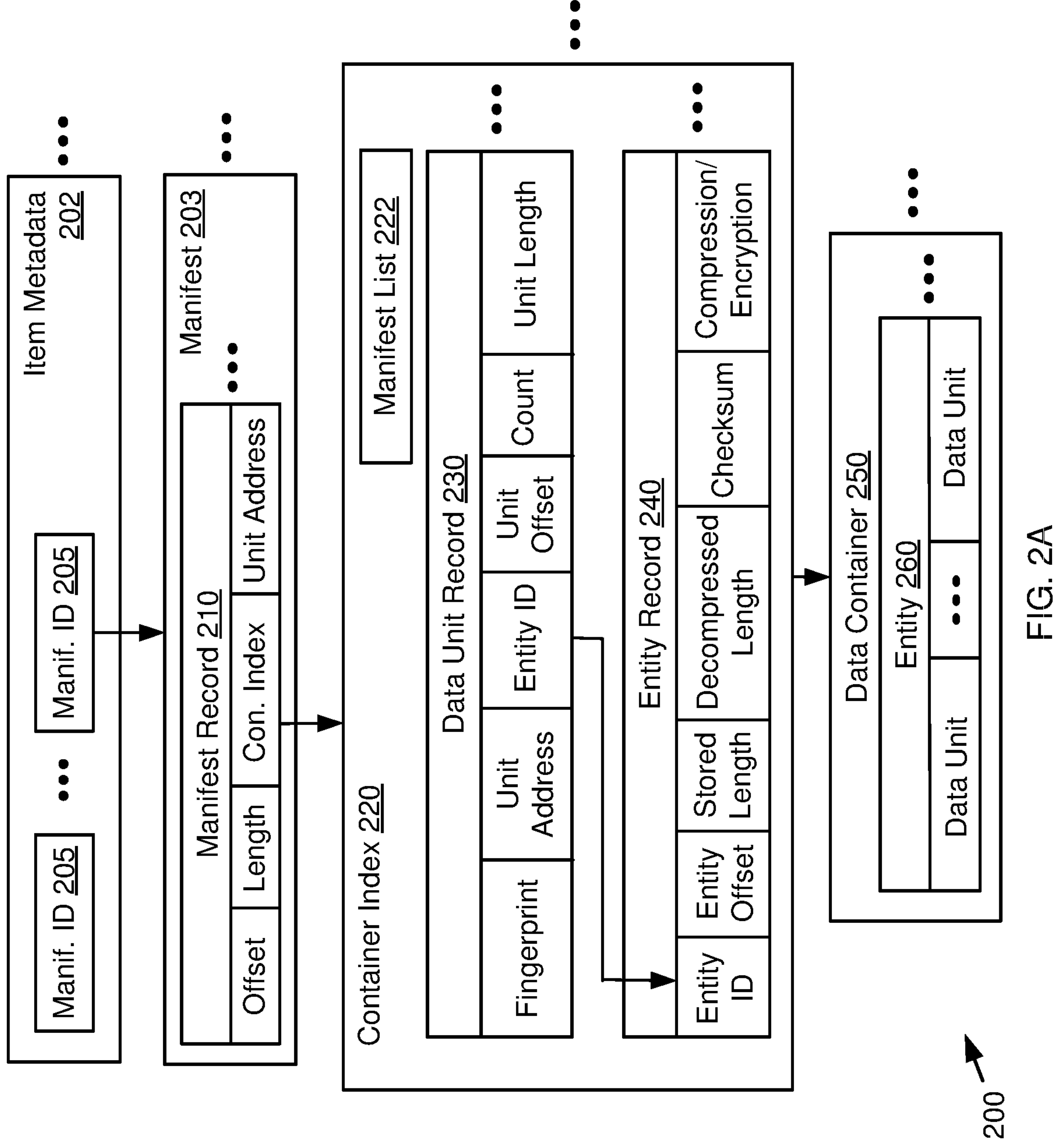

FIGS. 2A-2C—Example Data Structures

FIG. 2A shows an illustration of example data structures 200 used in deduplication, in accordance with some implementations. As shown, the data structures 200 may include item metadata 202, a manifest 203, a container index 220, and a data container 250. In some examples, the item metadata 202, the manifest 203, the container index 220, and the data container 250 may correspond generally to example implementations of item metadata 130, a manifest 150, a container index 160, and a data container 170 (shown in FIG. 1), respectively. In some examples, the data structures 200 may be generated and/or managed by the storage controller 110 (shown in FIG. 1).

In some implementations, the item metadata 202 may include multiple manifests identifiers 205. Each manifests identifier 205 may identify a different manifest 203. In some implementations, the manifests identifiers 205 may be arranged in a stream order (i.e., based on the order of receipt of the data units represented by the identified manifests 203). Further, the item metadata 202 may include a container list 204 associated with each manifest identifier 205. In some implementations, the container list 204 may include identifiers for a set of container indexes 220 that index the data units included in the associated manifest 203 (i.e., the manifest 203 identified by the associated manifest identifier 205).

Although one of each is shown for simplicity of illustration in FIG. 2A, data structures 200 may include a plurality of instances of item metadata 202, each including or pointing to one or more manifests 203. In such examples, data structures 200 may include a plurality of manifests 203. The manifests 203 may reference a plurality of container indexes 220, each corresponding to one of a plurality of data containers 250. Each container index 220 may comprise one or a plurality of data unit records 230, and one or a plurality of entity records 240.

As shown in FIG. 2A, in some examples, each manifest 203 may include one or more manifest records 210. Each manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, and a unit length. In some examples, the reference count value may indicate the number of manifest records 210 that reference the data unit record 230. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each data container 250 may include any number of entities 260, and each entity 260 may include any number of stored data units.

In some implementations, the unit address (included in the manifest record 210 and the data unit record 230) may be an identifier that deterministically identifies a particular data unit within a given container index 220. In some examples, the unit address may be a numerical value (referred to as the "arrival number") that indicates the sequential order of arrival (also referred to as the "ingest order") of data units being indexed in a given container index 220 (e.g., when receiving and deduplicating an inbound data stream). For example, the first data unit to be indexed in a container index 220 (e.g., by creating a new data unit record 230 for the first data unit) may be assigned an arrival number of "1," the second data unit may be assigned an arrival number of "2," the third data unit may be assigned an arrival number of "3," and so forth. However, other implementations are possible.

In some implementations, a manifest record 210 may use a run-length reference format to represent a continuous range of data units (e.g., a portion of a data stream) that are indexed within a single container index 220. The run-length reference may be recorded in the unit address field and the length field of the manifest record 210. For example, the unit address field may indicate the arrival number of a first data unit in the data unit range being represented, and the length field may indicate a number N (where "N" is an integer) of data units, in the data unit range, that follow the data unit specified by arrival number in the unit address field. The data units in a data unit range may have consecutive arrival numbers (e.g., because they are consecutive in an ingested data stream). As such, a data unit range may be represented by an arrival number of a first data unit in the data unit range (e.g., specified in the unit address field of a manifest record 210) and a number N of further data units in the data unit range (e.g., specified in the length field of the manifest record 210). The further data units in the data unit range after the first data unit may be deterministically derived by calculating the N arrival numbers that sequentially follow the specified arrival number of the first data unit, where those N arrival numbers identify the further data units in the data unit range. In such examples, manifest record 210 may include an arrival number "X" in the unit address field and a number N in the length field, to indicate a data unit range including the data unit specified by arrival number X and the data units specified by arrival numbers X+i for i=0 through i=N, inclusive (where "i" is an integer). In this manner, the manifest record 210 may be used to identify all data units in the data unit range.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

In some implementations, each container index 220 may include a manifest list 222. The manifest list 222 may be a data structure to store a set of entries, where each entry stores information regarding a different manifest 203 (or manifest record 210) that is indexed by the container index 220 (including the manifest list 222). For example, each time that the container index 220 is generated or updated to include information regarding a particular manifest record 210, the manifest list 222 in that container index 220 is updated to store an identifier of that manifest record 210. Further, the entries of the manifest list 222 may be arranged in their respective order of entry into the manifest list 222 (also referred to herein as the "arrival order" of the entries). In some examples, when a container index 220 is no longer associated with the manifest record 210, the identifier of the manifest record 210 is removed from the manifest list 222.

Referring now to FIG. 2B, shown is an example implementation of a manifest list 222. As shown in FIG. 2A, in some implementations, each entry of the manifest list 222 may only store a manifest identifier 205. However, other examples are possible. For example, each entry of the manifest list 222 may instead include both a manifest identifier 205 and at least one data unit range (e.g., a set of one or more data units that are included in the manifest 203 and that are indexed by the container index 220).

Referring now to FIG. 2C, shown is an example implementation of an alias data structure 270. The alias data structure 270 may correspond generally to an example implementation of the alias list 180 (shown in FIG. 1). As shown in FIG. 2C, the alias data structure 270 may include multiple entries, where each entry stores identifiers (e.g., fingerprints) of a corrupt data unit and its alias (i.e., the non-corrupt data unit has been determined to be the replacement for the corrupt data unit). In some implementations, an entry may be added to the alias data structure 270 upon determining that a particular non-corrupt data unit is the alias for a particular corrupt data unit.

Figure 3:
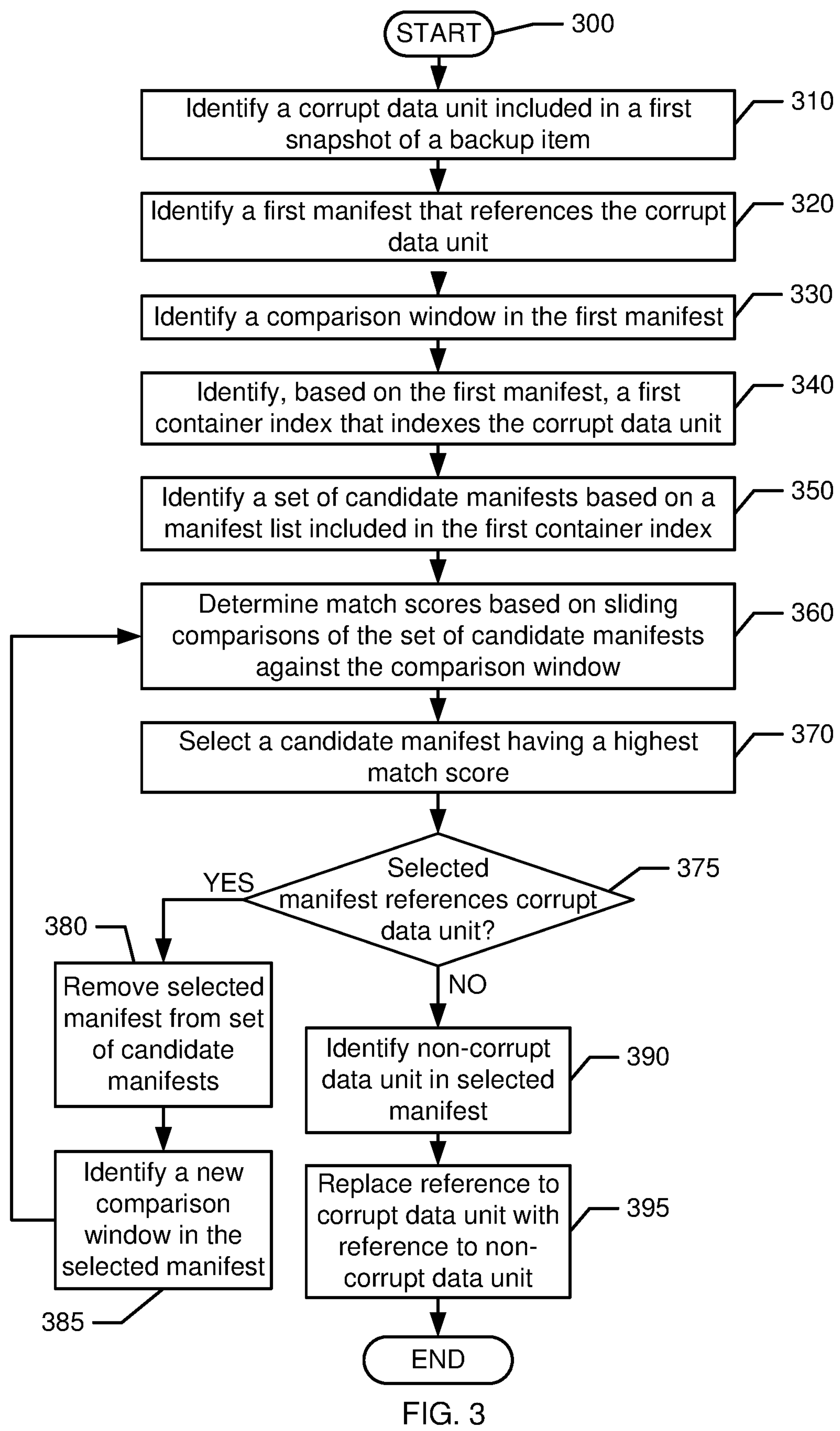
FIG. 3 is an illustration of an example process, in accordance with some implementations.

FIG. 3—Example Process for Repairing Snapshots

FIG. 3 shows is an example process 300 for repairing snapshots in a deduplication storage system, in accordance with some implementations. In some examples, the process 300 may be performed using the storage controller 110 (shown in FIG. 1). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 300 may be executed by a single processing thread. In other implementations, the process 300 may be executed by multiple processing threads in parallel (e.g., concurrently using the work map and executing multiple housekeeping jobs).

Figure 4A:
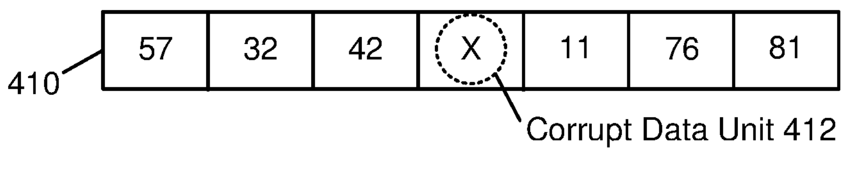
FIGS. 4A-4M are illustrations of example operations, in accordance with some implementations.
Figure 4B:
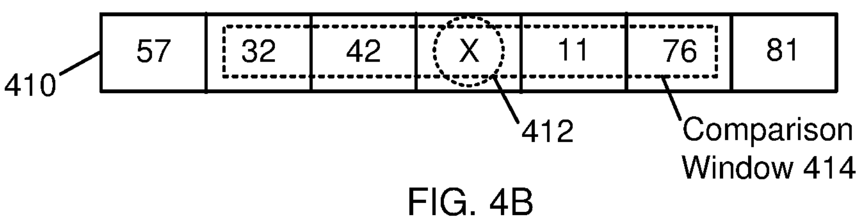
Figure 4C:
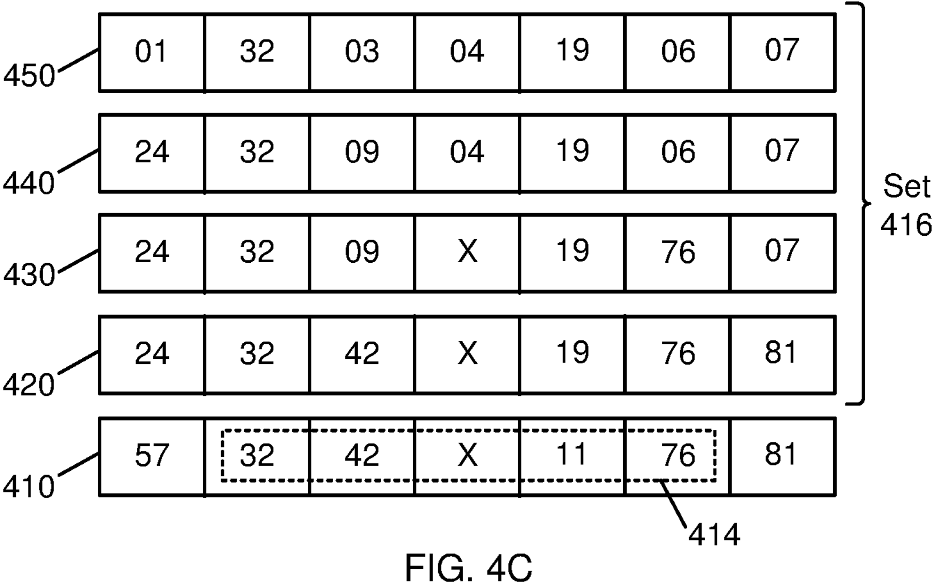

Block 310 may include identifying a corrupt data unit included in a first snapshot of a backup item. Block 320 may include identifying a first manifest that references the corrupt data unit. In some implementations, the manifest may reference a total number T (where "T" is an integer) of data units, and may record the order of receipt of the T data units into the manifest. For example, referring to FIGS. 1 and 4A, the storage controller 110 receives an indication (e.g., a user command, software message, etc.) identifying a data range in a snapshot (e.g., an offset and a length in a backup item) that includes a corrupt data unit 412 (or multiple corrupt data units). In some examples, the presence of the corrupt data unit 412 may be detected by a malware scan, an integrity test, and so forth. The storage controller 110 reads the item metadata 130 that represents the snapshot, identifies the manifest 410 that references the corrupt data unit 412 (i.e., data unit "X"), and loads the manifest 410 into memory 115. For the sake of simplicity, FIG. 4A shows the manifest 410 as including a total number T of seven data units. However, other sizes and arrangements of the manifest 410 are possible.

Block 330 may include identifying a comparison window in the first manifest. In some implementations, the comparison window may have a width W (where "W" is an integer) indicating the number of data units referenced in the comparison window, where the width W is smaller than the total number "T" of data units referenced in the manifest. Further, in some implementations, the width W may be an odd integer (i.e., having odd parity), such that a particular data unit is referenced in the center position of the comparison window. For example, referring to FIGS. 1 and 4B, the storage controller selects, in the manifest 410, a comparison window 414 having a width W equal to five (i.e., references five distinct data units). In some implementations, the corrupt data unit 412 is referenced in the center position of the comparison window 414. However, other sizes and/or arrangements of the comparison window 414 are possible.

Block 340 may include identifying, based on the first manifest, a first container index that indexes the corrupt data unit. Block 350 may include identifying a set of candidate manifests based on a manifest list included in the first container index. For example, referring to FIGS. 1-2A and 4C, the storage controller 110 reads the manifest 150 to identify the container index 160 that indexes the corrupt data unit, and then loads the container index 160 into memory 115. Further, the storage controller 110 reads the manifest list 222 (stored in the container index 160) to identify a set 416 of the manifests that are indexed by the container index 160 (e.g., candidate manifests 420, 430, 440, 450). In some implementations, the set 416 is arranged in arrival order (e.g., in order of entry into the manifest list 222). The storage controller 110 loads each candidate manifest in the set 416 into memory 115 (e.g., one at a time or as a group). In some examples, each candidate manifest in the set 416 may reference data units in a different snapshot of a particular source item. In such examples, each candidate manifest may record the order of data units in a particular portion of the source item at a different point in time (i.e., corresponding to each snapshot).

Figure 4D:
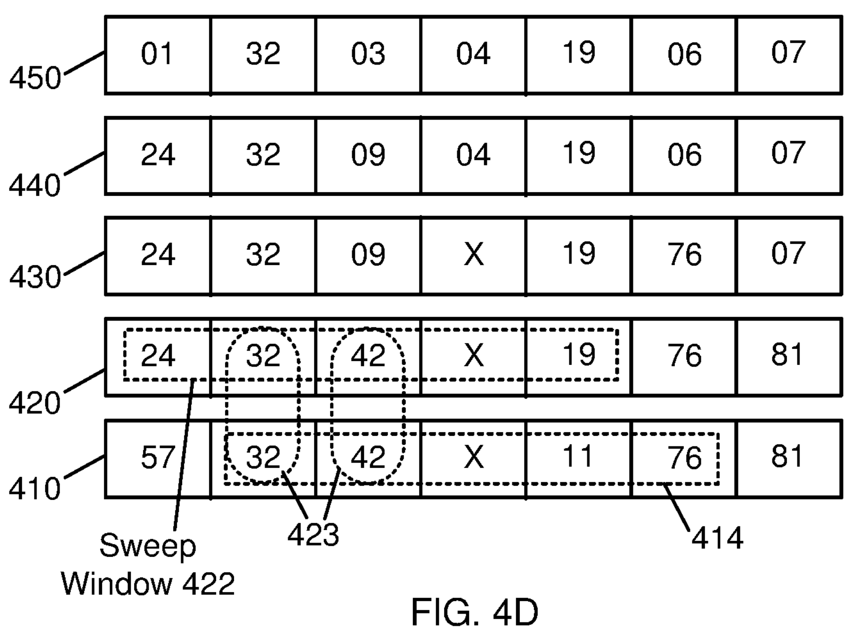

Block 360 may include determining match scores based on sliding comparisons of the set of candidate manifests against the comparison window. Block 370 may include selecting a candidate manifest having a highest match score. As used herein, a "sliding comparison" may refer to an operation including sliding a selection window (also referred as a "sweep window") across a candidate manifest to select different subsets of data units referenced in the candidate manifest, and comparing each subset of data units against the data units referenced in a current comparison window. In some implementations, the sweep window used in the sliding comparison may have a width equal to the width W of the comparison window. For example, referring to FIG. 4D, the controller selects the candidate manifest 420 (in the set 416) that most closely precedes the manifest 410 (identified at block 320). The controller initiates the sliding comparison of the candidate manifest 420 by placing a sweep window 422 in a first position, thereby selecting the left-most W data units referenced in the candidate manifest 420 (e.g., the earliest W data units in arrival order), where W is the width of the comparison window 414. The controller then determines a similarity value between the comparison window 414 and the sweep window 422 in the first position. In some implementations, the similarity value may be calculated as the total number of non-center data units (i.e., data units that are not referenced in the center position of a window) that are referenced in both the comparison window 414 and the current sweep window 422. For example, as shown in FIG. 4D, two non-center data units 423 (i.e., data units "32" and "42") are referenced in both the comparison window 414 and the sweep window 422. Accordingly, the similarity value for the sweep window 422 in the first position is equal to two.

Figure 4E:
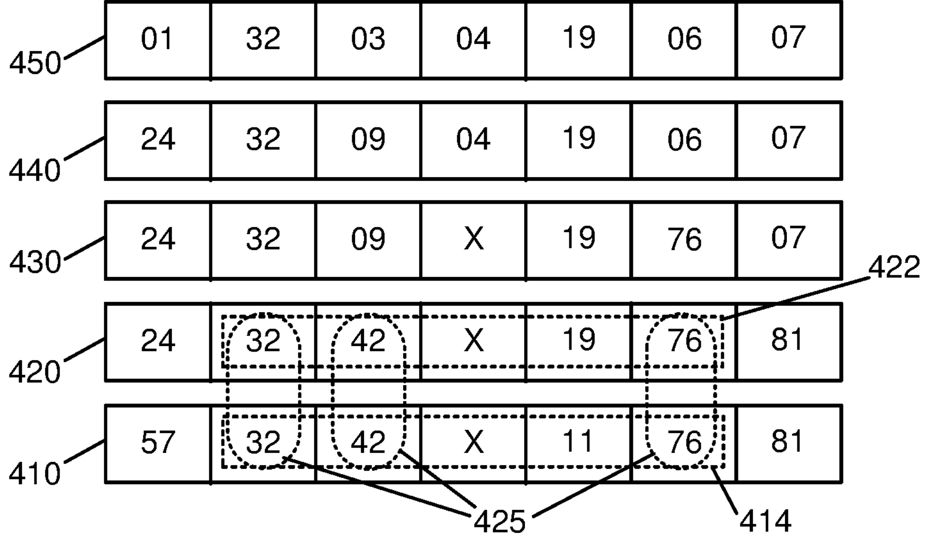

Referring now to FIG. 4E, the controller continues the sliding comparison of the candidate manifest 420 by sliding the sweep window 422 by one data unit reference right-ward into a second position (i.e., selecting data units "32," "42," "X," "19," and "76"). As shown in FIG. 4E, the controller then identifies three non-center data units 425 (i.e., data units "32," "42," and "76") are referenced in both the comparison window 414 and the sweep window 422 in the second position. Accordingly, the similarity value for the sweep window 422 in the second position is equal to three.

Figure 4F:
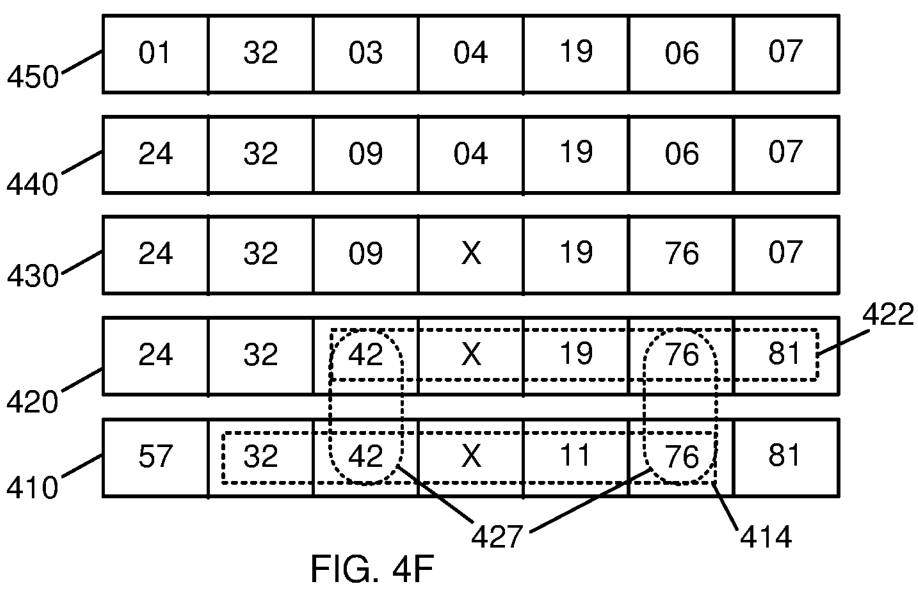

Referring now to FIG. 4F, the controller completes the sliding comparison of the candidate manifest 420 by sliding the sweep window 422 by one data unit reference right-ward into a third position (i.e., selecting data units "42," "X," "19," "76," and "81"). As shown in FIG. 4F, the controller then identifies two non-center data units 427 (i.e., data units "42" and "76") are referenced in both the comparison window 414 and the sweep window 422 in the third position. Accordingly, the similarity value for the sweep window 422 in the third position is equal to two.

Figure 4G:
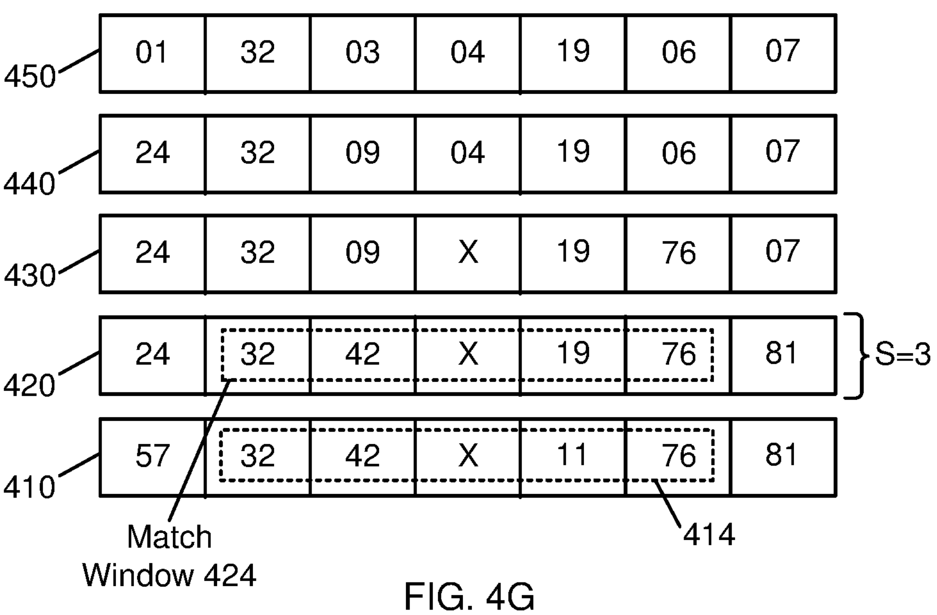

Referring now to FIG. 4G, the controller determines that the highest similarity score (i.e., three) in the sliding comparison of the candidate manifest 420 was obtained in the second position of the sweep window 422 (shown in FIG. 4E). Accordingly, the controller identifies the second position of the sweep window 422 as the match window 424 of the candidate manifest 420. As used herein, a "match window" may refer to a subset of data unit references in a candidate manifest that have a highest similarity with respect to the data unit references in a current comparison window (i.e., the comparison window being used for a sliding comparison). Further, as shown in FIG. 4G, the controller sets the match score of the candidate manifest 420 to three ("S=3"), corresponding to the similarity score for the match window 424.

Figure 4H:
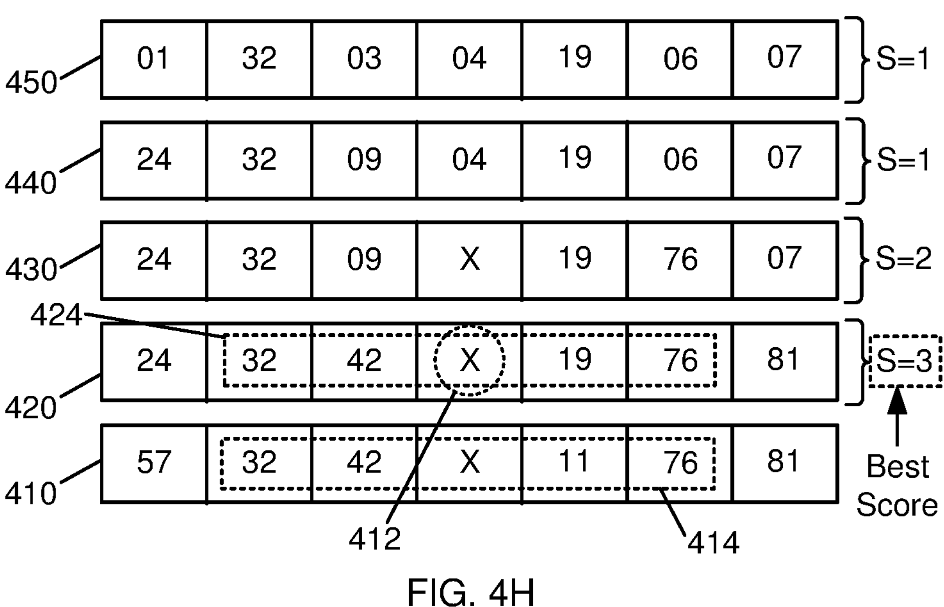

Referring now to FIG. 4H, the controller performs sliding comparisons of the set 416 (i.e., manifests 420, 430, 440, and 450) against the comparison window 414, and determines the match scores for the candidate manifests. Further, the controller selects the candidate manifest 420 having the best match score (i.e., three) of the set 416.

Figure 4I:
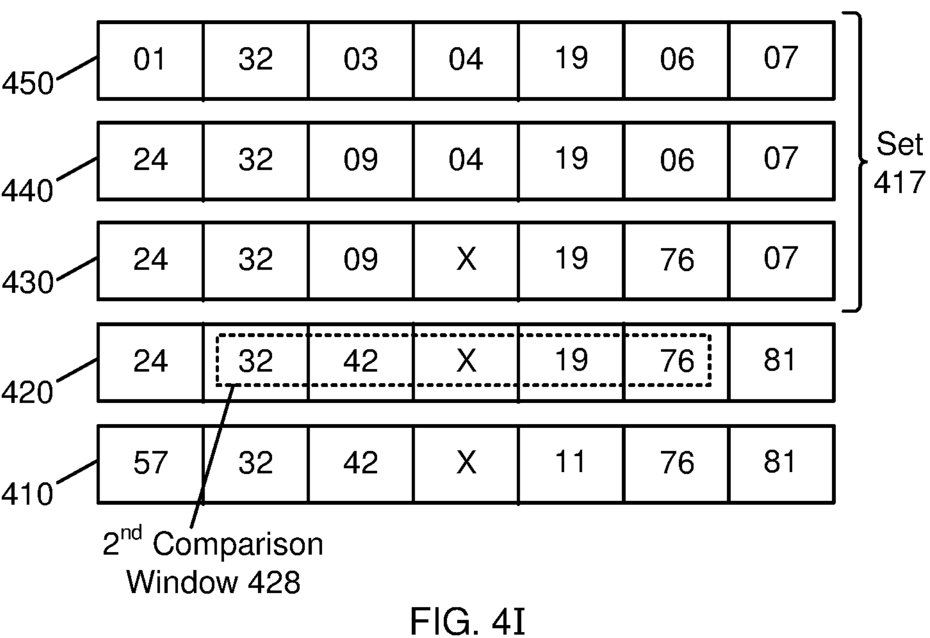

Referring again to FIG. 3, decision block 375 may include determining whether the selected manifest references the corrupt data unit (identified at block 310). If it is determined that the selected manifest references the corrupt data unit ("YES"), the process 300 may continue at block 380, including removing the selected manifest from the set of candidate manifests. Block 385 may include identifying a new comparison window in the selected manifest. After block 385, the process 300 may return to block 360 (i.e., to determine new match scores based on sliding comparisons of the remaining candidate manifests against the new comparison window). In some examples, blocks 360, 370, 375, 380 and 385 may be repeated in one or more loops, until reaching a negative determination at decision block 375 (i.e., upon determining that a selected candidate manifest does not reference the corrupt data unit). For example, referring to FIG. 4H, the controller determines that, in the candidate manifest 420 (selected at block 370), the center position of the match window 424 references the corrupt data unit 412 (which was also referenced in the manifest 410). In response to this determination, as shown in FIG. 4I, the controller removes the candidate manifest 420 from the set 416 to obtain a reduced set 417, and selects the match window 424 as a second comparison window 428 in the candidate manifest 420.

Figure 4J:
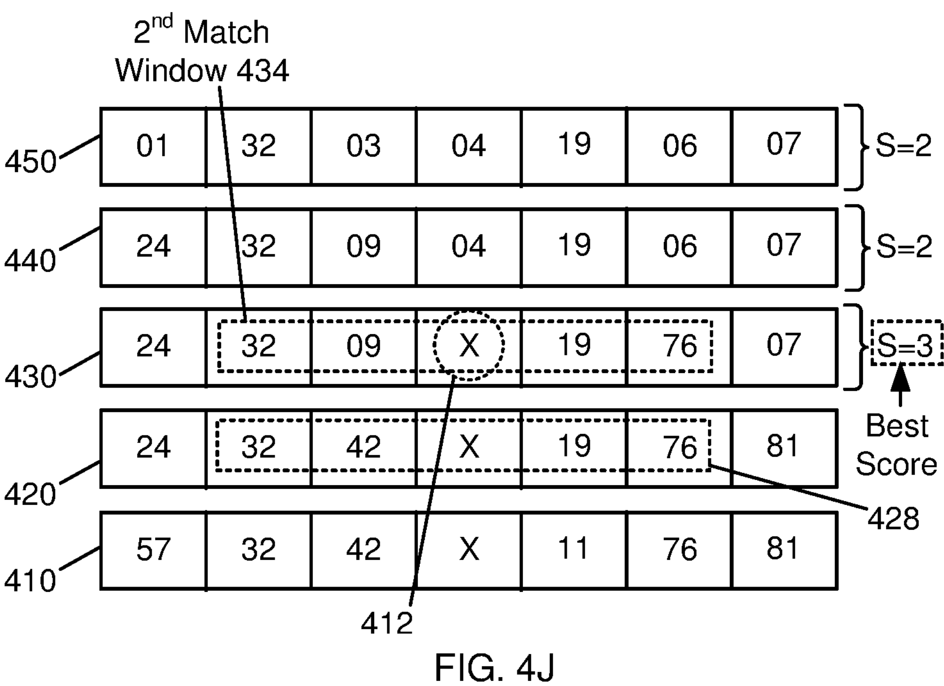
Figure 4K:
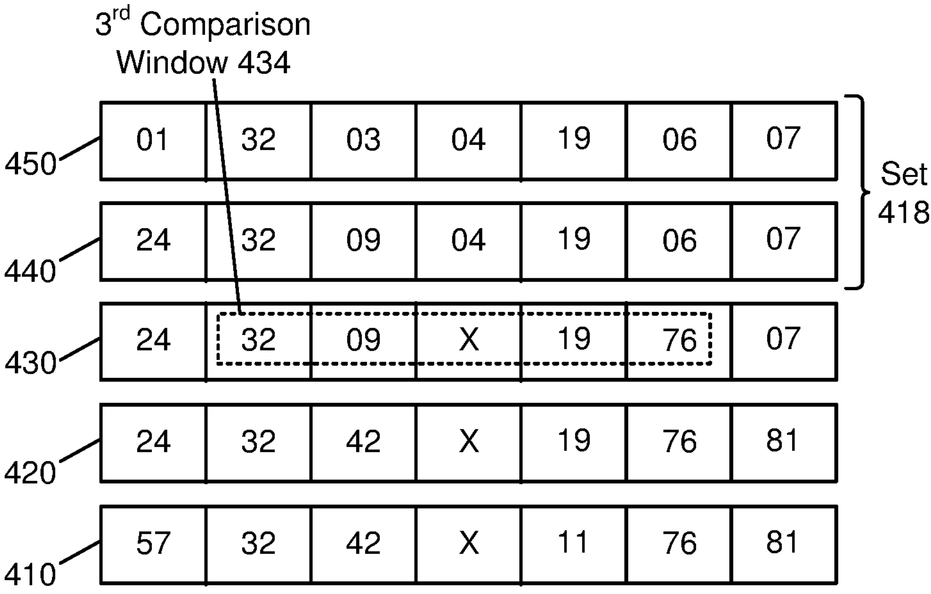

Referring now to FIG. 4J, the controller performs sliding comparisons of the reduced set 417 of candidate manifests (i.e., manifests 430, 440, 450) against the second comparison window 428, and determines the match scores for these candidate manifests. The controller then determines that candidate manifest 430 has the best match score (i.e., three), corresponding to the similarity score for the second match window 434 in the candidate manifest 430. Further, the controller determines that the center position of the second match window 434 references the corrupt data unit 412. In response to this determination, as shown in FIG. 4K, the controller removes the candidate manifest 430 from the reduced set 417 to obtain a second reduced set 418, and selects the second match window 434 as a third comparison window 438 in the candidate manifest 430.

Figures 4L, 4M:
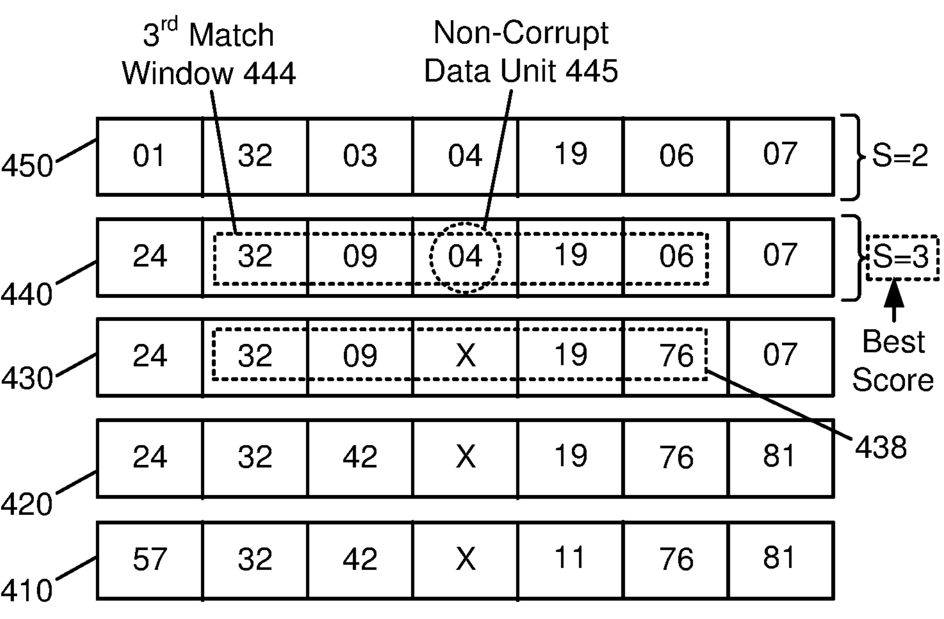

Referring again to FIG. 3, if it is determined at decision block 375 that the selected manifest does not reference the corrupt data unit ("NO"), the process 300 may continue at block 390, including identifying a non-corrupt data unit referenced in the selected manifest. Block 395 may include replacing, in the first manifest, a reference to the corrupt data unit with a reference to the identified non-corrupt data unit. After block 395, the process 300 may be completed. For example, referring to FIG. 4L, the controller performs sliding comparisons of the second reduced set 418 (i.e., manifests 440, 450) against the third comparison window 438, and determines the match scores for these candidate manifests. The controller then determines that candidate manifest 440 has the best match score (i.e., three), corresponding to the similarity score for the third match window 444 in the candidate manifest 440. Further, the controller determines that the center position of the third match window 444 does not reference the corrupt data unit 412, but instead references a non-corrupt data unit 445 (i.e., data unit "04"). In response to this determination, as shown in FIG. 4M, the controller performs a repair 460 using the non-corrupt data unit 445 (i.e., by replacing the references to the corrupt data unit 412 with references to the non-corrupt data unit 445) in each of the manifests 410, 420, 430 (i.e., the manifests that were previously determined to include the corrupt data units at decision block 375 shown in FIG. 3). In this manner, the controller may repair the affected manifests with reduced (or no) loss of data, and may thereby improve the performance of a system including the stored data.

In some implementations, the controller may create an entry in an alias list (e.g., alias list 180 shown in FIG. 1) to indicate that the non-corrupt data unit 445 has been determined to be a replacement (i.e., an alias) for the corrupt data unit 412. Subsequently, if a received data unit matches the corrupt data unit 412, the controller may use the alias list to replace the received data unit with the non-corrupt data unit 445. An example process for using an alias list is described below with reference to FIG. 5.

In some implementations, determining match scores based on sliding comparisons (e.g., in block 360 shown in FIG. 3) may be performed using different sizes of comparison windows. For example, a controller may perform an initial set of sliding comparisons using a first width of the comparison window (e.g., W=3), and may be unable to determine a best match window (in a candidate manifest) based on the match scores (e.g., if all match scores are equal, if all match scores are below a minimum threshold for a useful match score, and so forth). In this example, the controller may initiate a second set of sliding comparisons using a larger width of the comparison window (e.g., W=5), and may again attempt to determine the best match window based on the match scores. This process may be repeated (with increasing widths of the comparison window) until reaching a valid result from the sliding comparisons (i.e., determining a best match window in a candidate manifest).

It is noted that implementations are not limited by the examples shown in FIGS. 4A-4M. For example, it is contemplated that any or all of the comparison window 414 may not be centered in manifest 410. Similarly, the match window 424 may not be centered in the candidate manifest 420, and the second match window 434 may not be centered in the candidate manifest 430. Further, although FIG. 4H shows an example in which the selected candidate manifest 420 with the best match score is directly adjacent to the first manifest 410 (including the comparison window 414), it is contemplated that, in other examples, the selected candidate manifest may not be adjacent to the manifest including the comparison window. For example, if instead the candidate manifest 420 had a lower match score than the candidate manifest 430, then candidate manifest 430 may be selected for having the highest match score in the set 416. In this example, the candidate manifest 420 may not reference the same stream of data units (e.g., in a particular source item) that is referenced by the other candidate manifests in the set 416.

Figure 5:
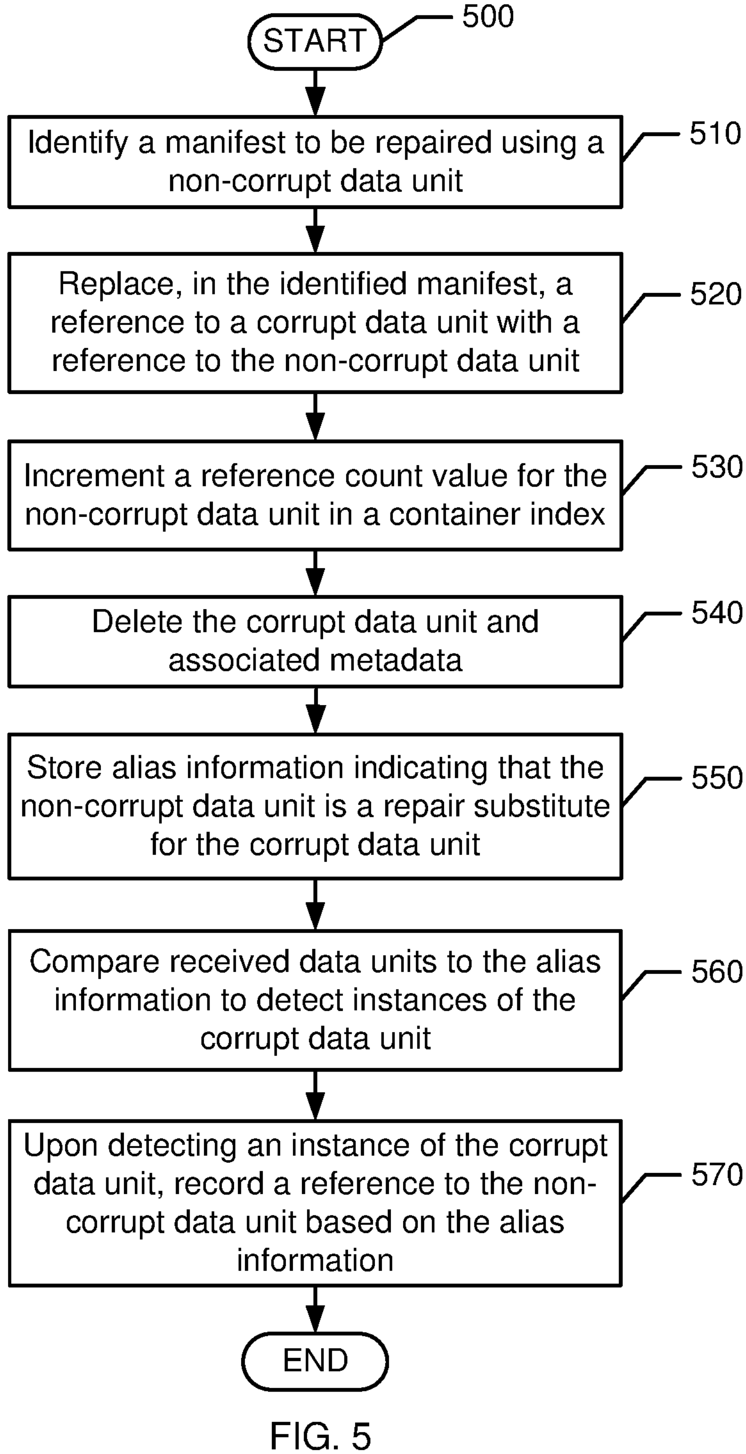
FIG. 5 is an illustration of an example process, in accordance with some implementations.

FIG. 5—Example Process for Using an Alias List

FIG. 5 shows is an example process 500 for using an alias list in a deduplication storage system, in accordance with some implementations. In some examples, the process 500 may be performed using the storage controller 110 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 500 may be executed by a single processing thread. In other implementations, the process 500 may be executed by multiple processing threads in parallel (e.g., concurrently using the work map and executing multiple housekeeping jobs).

Block 510 may include identifying a manifest to be repaired using a non-corrupt data unit. Block 520 may include replacing, in the identified manifest, a reference to a corrupt data unit with a reference to the non-corrupt data unit. For example, referring to FIGS. 4A-4M, a controller identifies a corrupt data unit 412 in a snapshot, identifies the manifest 410 that references the corrupt data unit 412, and selects a comparison window 414 in the manifest 410. The controller identifies a container index that indexes the corrupt data unit 412, and identifies a set 416 of candidate manifests that are indexed by the container index (e.g., using the manifest list 222 shown in FIG. 2B). Further, the controller determines match scores based on sliding comparisons of the set 416 of candidate manifests against the comparison window 414, selects the match window 424 in the candidate manifest 420 with the highest match score, and determines whether the match window 424 includes a reference to the corrupt data unit 412. If so, the controller performs one or more iterations of selecting a comparison window, performing sliding comparisons of the remaining candidate manifests, and selecting match windows from the remaining candidate manifests. Upon determining that a selected match window (e.g., third match window 444 in candidate manifest 440) does not include a reference to the corrupt data unit 412, the controller replaces, in the affected manifests, the references to the corrupt data unit 412 with references to the non-corrupt data unit 445 in the candidate subset 444.

Block 530 may include incrementing a reference count value for the non-corrupt data unit in a container index. Block 540 may include deleting the corrupt data unit and associated metadata. For example, referring to FIG. 1, the storage controller 110 increments the reference count (in a container index 160) that represents the non-corrupt data unit. Further, the controller deletes the corrupt data unit in a data container 170, and deletes the metadata associated with the corrupt data unit (e.g., in a container index 160).

Block 550 may include storing alias information indicating that the non-corrupt data unit is a repair substitute for the corrupt data unit. For example, referring to FIG. 1, the storage controller 110 adds a particular entry to the alias list 180, where the particular entry indicates that the corrupt data unit can be repaired or replaced by the non-corrupt data unit.

Block 560 may include comparing received data units to the alias information to detect instances of the corrupt data unit. Block 570 may include, upon detecting an instance of the corrupt data unit, recording a reference to the non-corrupt data unit based on the alias information. For example, referring to FIG. 1, the storage controller 110 receives a stream of data units to be stored in the storage system 100, and compares the received data units to the entries of the alias list 180 (e.g., by comparing a fingerprint of a received data unit to fingerprints, stored in the alias list 180, identifying the corrupt data units that have been determined to have repair substitutes). Upon determining that a received data unit matches the corrupt data unit listed in the particular entry of the alias list 180, the storage controller 110 does not record a reference to the corrupt data unit in the manifest 150 that records the order of the received stream. Instead, the storage controller 110 reads the particular entry to identify the non-corrupt data unit, and then records the identified non-corrupt data unit in the manifest 150 (i.e., in place of the corrupt data unit). Accordingly, the corrupt data unit is not stored as part of the deduplicated backup item (representing the received stream). In this manner, some implementations may reduce the amount of corrupt data stored in the storage system 100. Further, some implementations may reduce the loss of data and the performance impact associated with recovery from each instance of the corrupt data unit.

FIG. 6—Example Computing Device

FIG. 6 shows a schematic diagram of an example computing device 600. In some examples, the computing device 600 may correspond generally to some or all of the storage system 100 (shown in FIG. 1). As shown, the computing device 600 may include a hardware processor 602, a memory 604, and machine-readable storage 605 including instructions 610-660. The machine-readable storage 605 may be a non-transitory medium. The instructions 610-660 may be executed by the hardware processor 602, or by a processing engine included in hardware processor 602.

Instruction 610 may be executed to identify a corrupt data unit included in a first snapshot stored in a deduplication storage system. Instruction 620 may be executed to identify a first manifest that references the corrupt data unit, where the first manifest records an ingest order of data units of the first snapshot into the deduplication storage system. For example, referring to FIGS. 1 and 4A, the storage controller 110 receives an indication (e.g., a user command, software message, etc.) identifying a corrupt data unit 412 (or multiple corrupt data units). In some examples, the corrupt data unit 412 may be detected by a malware scan, an integrity test, a validity test, and so forth. The storage controller 110 reads the item metadata 130 that represents the snapshot, identifies the manifest 410 that includes the corrupt data unit 412, and loads the manifest 410 into memory 115.

Instruction 630 may be executed to identify, based on the first manifest, a first container index that indexes the corrupt data unit. Instruction 640 may be executed to determine, based on the first container index, a set of candidate manifests. For example, referring to FIGS. 1-2A and 4C, the storage controller 110 reads the manifest 150 to identify the container index 160 that indexes the corrupt data unit, and then loads the container index 160 into memory 115. Further, the storage controller 110 reads the manifest list 222 (stored in the container index 160) to identify a set 416 of candidate manifests that are indexed by the container index 160, and loads each candidate manifest in the set 416 into memory 115 (e.g., one at a time or as a group).

Instruction 650 may be executed to identify, in the set of candidate manifests, a second manifest having a highest match score with respect to a first portion of the first manifest. For example, referring to FIGS. 1 and 4B, the storage controller 110 selects a comparison window 414 in the manifest 410.

Instruction 660 may be executed to, in response to a determination that the identified second manifest having the highest match score does not reference the corrupt data unit, replace, in the first manifest, a reference to a corrupt data unit with a reference to a non-corrupt data unit referenced in the identified second manifest. For example, referring to FIGS. 4D-4M, the controller determines match scores based on sliding comparisons of the set 416 of candidate manifests against the comparison window 414, selects the match window 424 in the candidate manifest 420 with the highest match score, and determines whether the match window 424 references the corrupt data unit 412. If so, the controller performs one or more rounds of selecting a comparison window, performing sliding comparisons of the remaining candidate manifests, and selecting match windows in the remaining candidate manifests. Upon determining that a selected match window (e.g., third match window 444 in candidate manifest 440) does not reference the corrupt data unit 412, the controller replaces, in each of the manifests 410, 420, 430 (i.e., the manifests that were previously determined to include the corrupt data unit 412), the references to the corrupt data unit 412 with references to the non-corrupt data unit 445 in the candidate subset 444.

Figure 7:
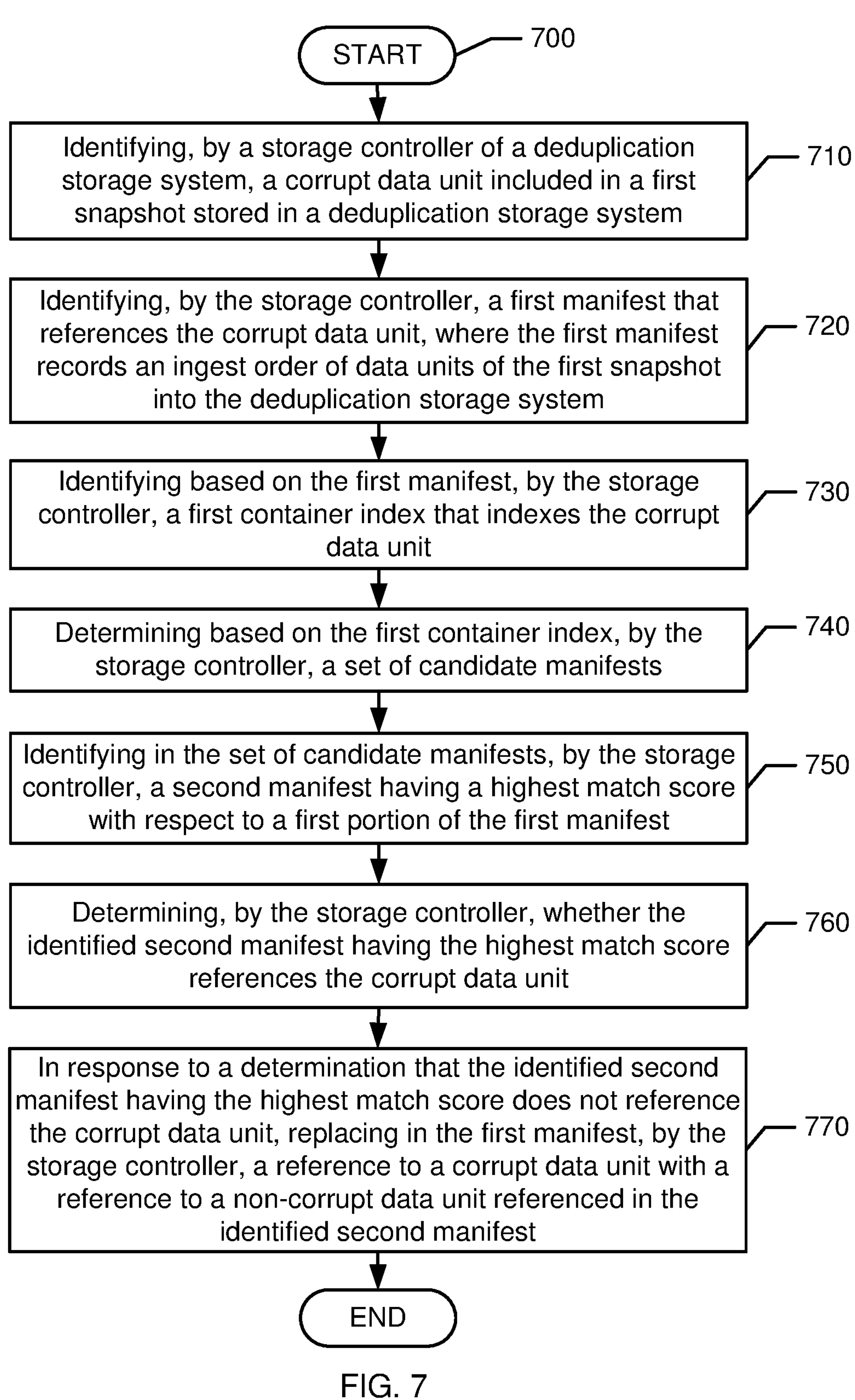
FIG. 7 is an illustration of an example process, in accordance with some implementations.

FIG. 7—Example Process for Snapshot Repair

FIG. 7 shows is an example process 700 for snapshot repair, in accordance with some implementations. In some examples, the process 700 may be performed using the storage controller 110 (shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 710 may include identifying, by a storage controller of a deduplication storage system, a corrupt data unit included in a first snapshot stored in a deduplication storage system. Block 720 may include identifying, by the storage controller, a first manifest that references the corrupt data unit, where the first manifest records an ingest order of data units of the first snapshot into the deduplication storage system.

Block 730 may include identifying based on the first manifest, by the storage controller, a first container index that indexes the corrupt data unit. Block 740 may include determining based on the first container index, by the storage controller, a set of candidate manifests. Block 750 may include identifying in the set of candidate manifests, by the storage controller, a second manifest having a highest match score with respect to a first portion of the first manifest.

Block 760 may include determining, by the storage controller, whether the identified second manifest having the highest match score references the corrupt data unit. Block 770 may include, in response to a determination that the identified second manifest having the highest match score does not reference the corrupt data unit, replacing in the first manifest, by the storage controller, a reference to a corrupt data unit with a reference to a non-corrupt data unit referenced in the identified second manifest. Blocks 710-770 may correspond generally to the examples described above with reference to instructions 610-660 (shown in FIG. 6).

FIG. 8—Example Machine-Readable Medium

FIG. 8 shows a machine-readable medium 800 storing instructions 810-850, in accordance with some implementations. The instructions 810-860 can be executed by a single processor, multiple processors, a single processing engine, multiple processing engines, and so forth. The machine-readable medium 800 may be a non-transitory storage medium, such as an optical, semiconductor, or magnetic storage medium. The instructions 810-860 may correspond generally to the examples described above with reference to instructions 610-660 (shown in FIG. 6).

Instruction 810 may be executed to identify a corrupt data unit included in a first snapshot stored in a deduplication storage system. Instruction 820 may be executed to identify a first manifest that references the corrupt data unit, where the first manifest records an ingest order of data units of the first snapshot into the deduplication storage system.

Instruction 830 may be executed to identify, based on the first manifest, a first container index that indexes the corrupt data unit. Instruction 840 may be executed to determine, based on the first container index, a set of candidate manifests.

Instruction 850 may be executed to identify, in the set of candidate manifests, a second manifest having a highest match score with respect to a first portion of the first manifest. Instruction 860 may be executed to, in response to a determination that the identified second manifest having the highest match score does not reference the corrupt data unit, replace, in the first manifest, a reference to a corrupt data unit with a reference to a non-corrupt data unit referenced in the identified second manifest.

In accordance with some implementations of the present disclosure, a controller of a deduplication storage system may repair snapshots that include corrupt data units. The controller may identify a corrupt data unit included in a snapshot of a source item. The controller may identify a first manifest that references the portion of the snapshot that includes the corrupt data unit. The controller may select a comparison window from the first manifest, and may compare the comparison window to a set of candidate manifests associated with previous snapshots of the source item. The controller may assign a match score to each candidate manifest based on its similarity to the comparison window. If the candidate manifest having the highest match score references the corrupt data unit, the controller may select a new comparison window from that candidate manifest, and may then compare the remaining candidate manifests to the new comparison window. Upon determining that the candidate manifest with the highest score does not reference the corrupt data unit, the controller may identify a non-corrupt data unit from that candidate manifest, and may determine that the non-corrupt data unit should be used in the snapshot, rather than the corrupt data unit. The controller may then replace the reference to the corrupt data unit (in the first manifest) with a reference to the non-corrupt data unit. In this manner, the controller may repair the affected manifests with reduced (or no) loss of data, and may thereby improve the performance of the storage system.

Note that, while FIGS. 1-8 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:

a processor;

a memory; and a machine-readable storage storing instructions, the instructions executable by the processor to:

identify a corrupt data unit included in a first snapshot stored in a deduplication storage system;

identify a first manifest that references the corrupt data unit, wherein the first manifest records an ingest order of data units of the first snapshot into the deduplication storage system;

identify, based on the first manifest, a first container index that indexes the corrupt data unit;

determine, based on the first container index, a set of candidate manifests;

identify, in the set of candidate manifests, a second manifest having a highest match score with respect to a first portion of the first manifest; and in response to a determination that the identified second manifest does not reference the corrupt data unit, replace, in the first manifest, a reference to a corrupt data unit with a reference to a non-corrupt data unit referenced in the identified second manifest.

2. The computing device of claim 1, including instructions executable by the processor to:

identify a first comparison window in the first manifest, wherein the first comparison window is the first portion of the first manifest;

perform a first set of sliding comparisons of the set of candidate manifests against the first comparison window; and calculate, based on the first set of sliding comparisons, a first set of match scores with respect to the first comparison window, wherein each match score of the first set of match scores indicates a degree of similarity between the first comparison window and a match window in a different candidate manifest of the set of candidate manifests, and wherein the first set of match scores comprises the highest match score.

3. The computing device of claim 2, including instructions executable by the processor to:

in response to a determination that the identified second manifest having the highest match score references the corrupt data unit:

remove, from the set of candidate manifests, the identified second manifest to obtain a first reduced set of candidate manifests;

identify a second comparison window in the identified second manifest;

perform a second set of sliding comparisons of the first reduced set of candidate manifests against the second comparison window;

calculate, based on the second set of sliding comparisons, a second set of match scores with respect to the second comparison window;

identify, in the first reduced set of candidate manifests, a third manifest having a highest match score with respect to the second comparison window; and in response to a determination that the identified third manifest does not reference the corrupt data unit, replace, in the first manifest, a reference to a corrupt data unit with a reference to a non-corrupt data unit referenced in the identified third manifest.

4. The computing device of claim 2, including instructions executable by the processor to:

for each candidate manifest of the set of candidate manifests, calculate a match score for the each candidate manifest based on a total number of non-center data units that are referenced in both the each candidate manifest and the first comparison window.

5. The computing device of claim 2, wherein the instructions executable to perform the first set of sliding comparisons comprise instructions executable to:

for each sliding comparison of the first set of sliding comparisons:

slide a sweep window across a different candidate manifest to select different subsets of data units referenced in the different candidate manifest; and compare each different subset of data units against data units referenced in the first comparison window.

6. The computing device of claim 1, including instructions executable by the processor to:

subsequent to a replacement of the reference to the corrupt data unit with the reference to the non-corrupt data unit, generate a first entry in an alias data structure, the first entry indicating that the non-corrupt data unit is a repair substitute for the corrupt data unit.

7. The computing device of claim 6, including instructions executable by the processor to:

receive data units to be stored in the deduplication storage system;

compare the received data units to a plurality of entries of the alias data structure;

in response to a determination that a received data unit matches the first entry of the alias data structure:

read the first entry to identify the non-corrupt data unit; and record the identified non-corrupt data unit in a manifest that records an order of the received data units.

8. The computing device of claim 1, including instructions executable by the processor to:

identify the first manifest based on item metadata that represents the first snapshot; and determine the set of candidate manifests based on a manifest list stored in the first container index, wherein the set of candidate manifests is arranged in an arrival order of the manifest list.

9. A method comprising:

identifying, by a storage controller of a deduplication storage system, a corrupt data unit included in a first snapshot stored in a deduplication storage system;

identifying, by the storage controller, a first manifest that references the corrupt data unit, wherein the first manifest records an ingest order of data units of the first snapshot into the deduplication storage system;

identifying based on the first manifest, by the storage controller, a first container index that indexes the corrupt data unit;

determining based on the first container index, by the storage controller, a set of candidate manifests;

identifying in the set of candidate manifests, by the storage controller, a second manifest having a highest match score with respect to a first portion of the first manifest;

determining, by the storage controller, whether the identified second manifest having the highest match score references the corrupt data unit; and in response to a determination that the identified second manifest having the highest match score does not reference the corrupt data unit, replacing in the first manifest, by the storage controller, a reference to a corrupt data unit with a reference to a non-corrupt data unit referenced in the identified second manifest.

10. The method of claim 9, comprising:

identifying a first comparison window in the first manifest, wherein the first comparison window is the first portion of the first manifest;

performing a first set of sliding comparisons of the set of candidate manifests against the first comparison window; and determining, based on the first set of sliding comparisons, a first set of match scores with respect to the first comparison window, wherein each match score of the first set of match scores indicates a degree of similarity between the first comparison window and a match window in a different candidate manifest of the set of candidate manifests, and wherein the first set of match scores comprises the highest match score.

11. The method of claim 10, comprising:

in response to a determination that the identified second manifest having the highest match score references the corrupt data unit:

removing, from the set of candidate manifests, the identified second manifest to obtain a first reduced set of candidate manifests;

identifying a second comparison window in the identified second manifest;

performing a second set of sliding comparisons of the first reduced set of candidate manifests against the second comparison window;

determining, based on the second set of sliding comparisons, a second set of match scores with respect to the second comparison window;

identifying, in the first reduced set of candidate manifests, a third manifest having a highest match score with respect to the second comparison window; and in response to a determination that the identified third manifest does not reference the corrupt data unit, replacing, in the first manifest, a reference to a corrupt data unit with a reference to a non-corrupt data unit referenced in the identified third manifest.

12. The method of claim 10, comprising:

for each candidate manifest of the set of candidate manifests, determining a match score for the each candidate manifest based on a total number of non-center data units that are referenced in both the each candidate manifest and the first comparison window.

13. The method of claim 9, comprising:

subsequent to a replacement of the reference to the corrupt data unit with the reference to the non-corrupt data unit, generating a first entry in an alias data structure, the first entry indicating that the non-corrupt data unit is a repair substitute for the corrupt data unit.

14. The method of claim 13, comprising:

receiving data units to be stored in the deduplication storage system;

comparing the received data units to a plurality of entries of the alias data structure;

in response to a determination that a received data unit matches the first entry of the alias data structure:

reading the first entry to identify the non-corrupt data unit; and recording the identified non-corrupt data unit in a manifest that records an order of the received data units.

15. A non-transitory machine-readable medium storing instructions that upon execution cause a processor to:

identify a corrupt data unit included in a first snapshot stored in a deduplication storage system;

identify a first manifest that references the corrupt data unit, where the first manifest records an ingest order of data units of the first snapshot into the deduplication storage system;

identify, based on the first manifest, a first container index that indexes the corrupt data unit;

determine, based on the first container index, a set of candidate manifests;

identify, in the set of candidate manifests, a second manifest having a highest match score with respect to a first portion of the first manifest; and in response to a determination that the identified second manifest having the highest match score does not reference the corrupt data unit, replace, in the first manifest, a reference to a corrupt data unit with a reference to a non-corrupt data unit referenced in the identified second manifest.

16. The non-transitory machine-readable medium of claim 15, including instructions that upon execution cause the processor to:

identify a first comparison window in the first manifest, wherein the first comparison window is the first portion of the first manifest;

perform a first set of sliding comparisons of the set of candidate manifests against the first comparison window; and calculate, based on the first set of sliding comparisons, a first set of match scores with respect to the first comparison window, wherein each match score of the first set of match scores indicates a degree of similarity between the first comparison window and a match window in a different candidate manifest of the set of candidate manifests, and wherein the first set of match scores comprises the highest match score.

17. The non-transitory machine-readable medium of claim 16, including instructions that upon execution cause the processor to:

in response to a determination that the identified second manifest having the highest match score references the corrupt data unit:

remove, from the set of candidate manifests, the identified second manifest to obtain a first reduced set of candidate manifests;

identify a second comparison window in the identified second manifest;

perform a second set of sliding comparisons of the first reduced set of candidate manifests against the second comparison window;

calculate, based on the second set of sliding comparisons, a second set of match scores with respect to the second comparison window;

identify, in the first reduced set of candidate manifests, a third manifest having a highest match score with respect to the second comparison window; and in response to a determination that the identified third manifest does not reference the corrupt data unit, replace, in the first manifest, a reference to a corrupt data unit with a reference to a non-corrupt data unit referenced in the identified third manifest.

18. The non-transitory machine-readable medium of claim 16, including instructions that upon execution cause the processor to:

for each candidate manifest of the set of candidate manifests, calculate a match score for the each candidate manifest based on a total number of non-center data units that are referenced in both the each candidate manifest and the first comparison window.

19. The non-transitory machine-readable medium of claim 16, including instructions that upon execution cause the processor to:

for each sliding comparison of the first set of sliding comparisons:

slide a sweep window across a different candidate manifest to select different subsets of data units referenced in the different candidate manifest; and compare each different subset of data units against data units referenced in the first comparison window.

20. The non-transitory machine-readable medium of claim 15, including instructions that upon execution cause the processor to:

identify the first manifest based on item metadata that represents the first snapshot; and determine the set of candidate manifests based on a manifest list stored in the first container index, wherein the set of candidate manifests is arranged in an arrival order of the manifest list.

* * * * *